(12) United States Patent
Weinstein et al.

(10) Patent No.: US 10,135,877 B2
(45) Date of Patent: *Nov. 20, 2018

(54) ENFORCING USAGE POLICIES ON COMBINATIONS OF COLLECTED DATA TO BE DISSEMINATED TO DESTINATION SYSTEMS

(71) Applicant: Adobe Systems Incorporated, San Jose, CA (US)

(72) Inventors: David Weinstein, Rockville Centre, NY (US); Harleen Sahni, Astoria, NY (US); Matthew Donofrio, Commack, NY (US); Edward Schuchardt, New York, NY (US); Vinay Goel, Brooklyn, NY (US); Rafaat Hossain, Jamaica, NY (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/894,997

(22) Filed: Feb. 13, 2018

(65) Prior Publication Data

US 2018/0176263 A1 Jun. 21, 2018

Related U.S. Application Data

(63) Continuation of application No. 14/854,464, filed on Sep. 15, 2015, now Pat. No. 9,948,683.

(51) Int. Cl.
*H04L 29/06* (2006.01)

(52) U.S. Cl.
CPC ............ *H04L 63/205* (2013.01); *H04L 63/10* (2013.01)

(58) Field of Classification Search
CPC .............................. H04L 63/205; H04L 63/10
See application file for complete search history.

(56) References Cited

U.S. PATENT DOCUMENTS 9,948,683 B2 *  4/2018  Weinstein .............. H04L 63/10
2010/0229226 A1   9/2010  Yasrebi et al.

OTHER PUBLICATIONS

Notice of Allowance from related U.S. Appl. No. 14/854,464, dated Dec. 5, 2017, 16 pages.

* cited by examiner

*Primary Examiner* — Baotran N To
(74) *Attorney, Agent, or Firm* — Kilpatrick Townsend & Stockton LLP

(57) ABSTRACT

This disclosure relates to enforcing restrictions on data collected from a first set of systems and disseminated to a second set of systems. For example, enforcing a set of restrictions includes receiving a first trait and a second trait that include data describing a user that has interacted with an online service. The first trait is labelled with a first usage restriction and the second trait is labelled with a second usage restriction different from the first usage restriction. The first trait and the second trait are combined into a segment. The segment preserves labelling of the first trait with the first usage restriction and the second trait with the second usage restriction. Use of the segment is controlled based on the first usage restriction and the second usage restriction.

20 Claims, 10 Drawing Sheets

CREATE A DATA SOURCE — 302

DATA SOURCE DETAILS

NAME: 304

INTEGRATION CODE: 306

DESCRIPTION: 308

MARKETING CLOUD VISITOR ID VERSION: 310

ID TYPE: 312

DATA EXPORT CONTROLS — 314

- ☑ NO RESTRICTION
- ☐ CANNOT BE TIED TO PERSONALLY IDENTIFIABLE INFORMATION
- ☐ CANNOT BE USED FOR ONSITE AD TARGETING
- ☐ CANNOT BE USED FOR OFFSITE AD TARGETING
- ☐ CANNOT BE USED FOR ONSITE PERSONALIZATION

DESTINATION BUILDER — 402

∨ BASIC INFORMATION ⓘ

NAME: __404__

DESCRIPTION: __406__

PLATFORM: __408__ ▾

TYPE: __410__ ▾

AUTO-FILL DESTINATION MAPPING ☐ — 412

— 414

∨ DATA EXPORT LABELS

416 {
- ☐ CONTAINS IDENTIFIABLE INFORMATION
- ☐ USED FOR ONSITE AD TARGETING
- ☐ USED FOR OFFSITE AD TARGETING
- ☐ USED FOR ONSITE PERSONALIZATION

[ SAVE ]   [ CANCEL ]

ENFORCING USAGE POLICIES ON COMBINATIONS OF COLLECTED DATA TO BE DISSEMINATED TO DESTINATION SYSTEMS

CROSS-REFERENCE TO RELATED APPLICATION

This application is a continuation of U.S. patent application Ser. No. 14/854,464, filed on Sep. 15, 2015, now allowed, the contents of all of which are incorporated herein by reference.

TECHNICAL FIELD

This disclosure relates generally to computer-implemented methods and systems, and more particularly relates to enforcing usage policies during the electronic communication of collected data.

BACKGROUND

Data management platforms are used to integrate online and offline data to deliver a unified view of a group of third-party users. For example, the data management platform may collect large amounts of data describing characteristics or activities of third-party users that have interacted with different online services (e.g., social media websites, search engines, etc.) from various first-party activities. This data can describe, for example, network page visits, mobile application activity, offline activity, etc.

In some cases, operators of data management platforms or operators of online services may enter agreements with other parties (e.g., customers or other users of online services) regarding how the collected data will be used after its collection. For example, an operator of a data management platform may enter into contractual agreements with other parties (e.g., third-party providers) that define a set of privacy policies or other usage policies to which the operator must legally adhere. Thus, when disseminating the data to third-party providers or other destinations, the operator of a data management platform must comply with the agreed-upon restrictions on dissemination of the data.

In prior solutions for enforcing these restrictions, analysts are used to manually verify, prior to disseminating collected data, that the dissemination will not breach any contractual agreements. These solutions present disadvantages. For example, given the amount and complexity of the collected data, the likelihood of inadvertently violating a restriction is significantly increased when relying on manual review of the data. Furthermore, these solutions requiring manual review can increase the costs (e.g., time expenditure by analysts) of enforcing privacy restrictions or other usage policies. These solutions can also cause delays in delivering potentially sensitive data in response to requests from consumers of the data. Thus, prior solutions increase the cost of enforcing privacy restrictions or other usage policies while also increasing the risk that such restrictions will be accidentally violated, to the user. These disadvantages are exacerbated when the received data originates from multiple sources and has, potentially, multiple intended destinations.

It is therefore desirable to automatically enforce privacy restrictions or other usage policies on data received from multiple sources in a more accurate and efficient manner.

SUMMARY

According to certain embodiments, systems and methods are disclosed for enforcing restrictions on data. These embodiments involve determining restrictions on data based on the source of the data, determining a set of activities associated with a destination, and determining whether the set of activities associated with the destination will violate the restrictions on the data. These embodiments can further prevent additions or modifications to the data that would violate restrictions already in place.

Certain embodiments for enforcing a set of restrictions includes receiving a first trait and a second trait, each of which includes data describing one or more users that have interacted with an online service. The first trait is labelled with a first usage restriction and the second trait is labelled with a second usage restriction different from the first usage restriction. The first trait and the second trait are combined into a segment (e.g., a collection of traits). The segment preserves labelling of the first trait with the first usage restriction and the second trait with the second usage restriction. Use of the segment is controlled based on the first usage restriction and the second usage restriction. For example, if a segment includes a first trait labelled with the restriction "PERSONALLY_IDENTIFIABLE_INFORMATION" and a second trait labelled with the restriction "ONSITE_AD_TARGETING," the segment is therefore subject to restrictions associated with the label "PERSONALLY_IDENTIFIABLE_INFORMATION" and restrictions associated with the label "ONSITE_AD_TARGETING."

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings, where:

FIG. 3 is a diagram depicting an example of an interface used by the restriction compliance engine for obtaining a set of restrictions to be associated with a data source according to certain exemplary embodiments;

FIG. 4 is a diagram depicting an example of an interface for obtaining, by the restriction compliance engine, information related to a set of activities to be associated with a destination according to certain exemplary embodiments;

DETAILED DESCRIPTION

Figure 1:
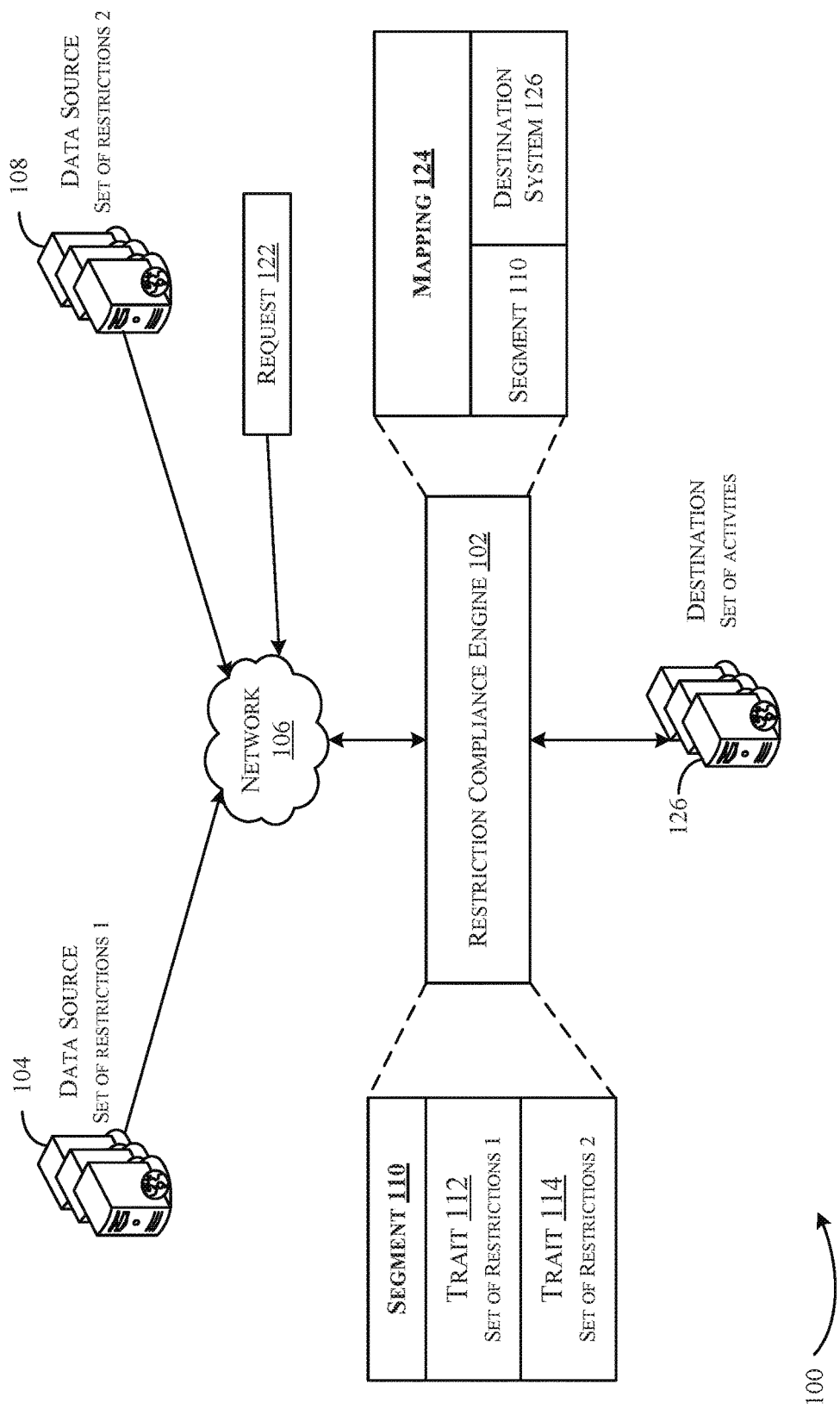
FIG. 1 is a block diagram depicting an example of a restriction compliance engine that determines restrictions on traits and enforces those restrictions based on activities performed by one or more destinations, according to certain exemplary embodiments.

According to certain embodiments, systems and methods are disclosed for enforcing restrictions on data. As noted above, tracked user interaction data (e.g., website analytics data, e-mail interaction data, etc.) and other collected user data (e.g., personal information from customer profiles) is often subject to various use restrictions. Marketers and others, who may use the collected data for targeted marketing, often find it burdensome and infeasible to ensure compliance with the restrictions, particularly in circumstances in which user data subject to one set of restrictions is combined with other user data that is subject to different restrictions. Certain embodiments address this problem by labeling collected user data with restriction information (which ensures that such labels persist when the user data is combined with other data) and controlling how the data is used based on the restrictions.

For example, an online service provider that uses the restriction compliance engine may provide (e.g., via an ad server) an advertisement on a website of a third-party provider. Often times, the online service provider is allowed by the third-party provider to collect data (e.g., traits including user interaction data, personal information from customer profiles, etc.) related to the advertisement. Typically, the third-party provider places privacy restrictions or other usage restrictions (e.g., via contractual agreements) on the collected data to prevent the online service provider from using the data for specific purposes (e.g., matching a specific user to the collected data using personally identifiable information, using the data for onsite advertisement targeting, using the data for offsite advertisement targeting, using the data for onsite personalization, etc.). In some embodiments, the online service provider combines data from the third-party provider with data received from his own website to produce a segment (e.g., a collection of traits).

In this example, the online service provider may wish to disseminate the combined data to a destination (e.g., another system or device). To reduce or eliminate the need for manual review of this data prior to its dissemination, the restriction compliance engine is used to label the data with appropriate privacy restrictions or other usage restrictions. For example, if the third-party provider prohibits the collected data from being used to match collected data to a user via personally identifiable information, the restriction compliance engine is used to label the collected data with a restriction such as "PERSONALLY_IDENTIFIABLE_INFORMATION." In some embodiments, the restriction compliance engine is used to label a data source, from which the data is collected, with the restriction. By applying the label to the data source, the data collected from the data source is considered subject to the same restriction. Therefore, a segment or other data structure in which the collected data is stored is likewise subject to restrictions associated with the label "PERSONALLY_IDENTIFIABLE_INFORMATION," and the restriction compliance engine automatically applies these restrictions if a request to disseminate the collected data is received.

In some embodiments, labelling the data collected from the third-party provider in this manner allows the online service provider to reduce or eliminate problems resulting from manual review of this collected data when enforcing the restrictions set in place by the third-party provider. In one example, the costs associated with the manual process (and the potential failure to ensure compliance with various usage restrictions) are reduced. In another example, the likelihood of inadvertently violating a restriction is significantly reduced by decreasing reliance on manual review of the data.

As used herein, the term "trait" is used to refer to metadata that describes characteristics of data collected by an online service provider from a third-party website. Examples of traits include (but are not limited to) user interactions that generated the data; a name, address, an age or other demographic information, or other information about a user whose interactions generated the data; an internet protocol address of a device used to access the third-party website; a navigation history (clicks, hyperlink selections, etc.) of a browser used to access the third-party website; a purchase history of a user whose interactions generated the data; and the types of content (e.g., a video, an advertisement, etc.) presented by the third-party website and with which users interacted to generate the collected data.

As used herein, the term "restriction" is used to refer to a prohibition on the types of activities in which collected data may be used. Restrictions may relate to privacy concerns, contractual obligations, or any other broad-based usage restriction between two entities. In various embodiments, the restriction applies to particular uses of data having a certain trait or applies to any use of the data having the trait. A restriction includes (but is not limited to) a restriction for matching a user with certain collected data using personally identifiable information, a restriction on using collected data for targeting advertisements to particular users whose interactions generated the collected data, a restriction on using collected data for personalizing an online experience to a given user whose interactions generated the collected data, and the like. In some embodiments, a set of restrictions includes a set of labels applied to a data source to denote a set of restrictions for data originating from the data source.

As used herein, the term "segment" is used to refer to a stored collection of one or more traits that originate from one or more data sources. The collection of traits in a segment relate to a set of users (first-party and/or third-party users) who share common attributes. Examples of a segment include (but are not limited to) a collection of traits related to third-party users who viewed a particular advertisement on a third-party webpage over a specified time range, a collection of traits related to first-party users who viewed articles on a subject between a specified minimum amount of time and a specified maximum amount of time (over a last specified time period for third-party users who have ever viewed an article on a different subject), a collection of traits related to first-party users who purchased a particular product, a collection of traits related to first-party and third-party users who viewed articles on a common subject, a collection of traits related to third-party users who purchased an item after viewing a product page on a third-party website, and a collection of traits related to users that do not exhibit a particular characteristic (e.g., a collection of users who have a collection of traits for viewing a product and do not have any of a collection of traits that exhibit a particular characteristic such as buying the product). Traits may be combined in a segment using any suitable combination of Boolean operators (AND, OR, or NOT). Data describing a segment is stored using any suitable storage object (e.g., a database of the various traits for the segment).

In some embodiments, destinations are associated with a set of activities (e.g., performing user identification operations on received data, performing onsite advertisement targeting, performing offsite advertisement targeting, performing operations related to onsite personalization, etc.). The restriction compliance engine is used to apply one or more labels to a destination to indicate types of activity performed by the destination system.

In some embodiments, the restriction compliance engine or another suitable application that includes the restriction compliance engine is used to apply suitable labels to both data sources and data destinations systems to which collected data is disseminated. Labels on data sources indicate restrictions on data received from those data sources. Labels on destination systems indicate activities performed by the destination systems on collected data. In one example, a label "PII" is used to indicate that personally identifiable information is used to label data from data sources that prohibit matching specific users to collected data, and is also used to label activities of destination systems that utilize personally identifiable information (e.g., to generate lists of potential advertisement recipients). In another example, a label such as "ONSITE_AD_TARGETING" is used to indicate that a data source prohibits the use of collected data for performing targeted advertising and is also used to indicate that a destination system performs targeted advertising. In these embodiments, the restriction compliance engine uses the labels to determine whether data collected from a given data source may be provided to a given destination system. For example, if a data source is labelled with the "PII" restriction and a label for the destination system includes the "PII" label, the restriction compliance engine prevents the dissemination to the destination system of data collected from the data source.

Referring now to the drawings, FIG. 1 is a block diagram 100 depicting an example of a restriction compliance engine 102 that determines restrictions on traits and enforces those restrictions based on activities performed by one or more destination systems 126. Enforcing the restrictions includes, for example, determining whether to allow dissemination of particular traits to a particular destination.

In some embodiments, restriction compliance engine 102 obtains data having trait 112 from data source 104 via network 106 and obtains data having trait 114 from data source 108 via the network 106. The network 106 (and any network described herein) includes any appropriate set of communicatively coupled computing devices and equipment that electronically transmit and receive data. Examples of a network 106 include (but are not limited to) an intranet, the Internet, a cellular network, a local area network, a wide area network, or any other such network or combination thereof.

The restriction compliance engine 102 (or a data management application that includes or communicates with the restriction compliance engine 102) receives user input that causes data with traits 112 and 114 to be stored in a segment 110. Each of the traits 112 and 114 are associated with a corresponding set of restrictions. In examples included herein, the set of restrictions for a trait corresponds to one or more restrictions related to the data source from which the trait originated. For example, because data source 104 is associated with a first set of restrictions (e.g., "set or restrictions 1"), trait 112 that is received from data source 104 is subject to the same restrictions. Similarly, because data source 108 is associated with a different set of restrictions (e.g., "set of restrictions 2"), trait 114 that is received from data source 108 is subject to the same restrictions. In some examples, an association of trait 112 with restriction type 1 is stored in segment 110 or a separate mapping accessible to the restriction compliance engine 102. In some embodiments, segment 110 includes a data object, such as a database, or any other suitable data structure for maintaining a collection of traits and corresponding usage restrictions.

In some embodiments, restriction compliance engine 102 receives a request 122 to disseminate the segment 110. The request 122 may be received from a destination system 126 or any other system. In response to the request, the restriction compliance engine 102 determines a set of restrictions for the segment 110 (e.g., the union of the set of restrictions corresponding to trait 112 and trait 114) and a set of activities for destination system 126. The restriction compliance engine 102 performs an intersection of the set of restrictions for the segment 110 and the set of activities for the destination system 126. If performing the intersection results in a non-empty intersecting set (e.g., at least one activity violates at least one restriction), then a restrictions violation is indicated. If the intersecting set is empty, then no restrictions violation is indicated.

In some embodiments, if no restrictions violation is indicated, the restriction compliance engine 102 updates a mapping 114 to indicate that disseminating data from segment 110 to destination system 126 causes no restriction violations to occur. The mapping 114 may be utilized to reduce future computations. For example, a subsequent request to send the segment 110 to the destination system 126 may be received by the restriction compliance engine 102. In this example, neither the restrictions on the segment 110 nor the activities performed by the destination system 126 have any been modified since mapping 124 was updated as indicated in FIG. 1. Therefore, the restriction compliance engine 102 may forego the processing described above by consulting the mapping 124 to determine whether the dissemination will cause restriction violations.

In some embodiments, data that is associated with a restriction (the segment 110 and, in some cases, the trait 112, the trait 114 of FIG. 1) may be labelled using the restriction compliance engine 102 prior to being disseminated to the destination system 126. For example, a macro (e.g., "<DATA_RESTRICTIONS>") may be added to the data prior to dissemination. When the data is prepared for dissemination to a destination system 126, the restriction compliance engine 102 replaces the macro with a set of labels that indicates one or more restrictions to be applied to the data by another system (e.g., the destination system 126). The labels allow the destination system 126 to enforce a set of restrictions on the data.

Figure 2:
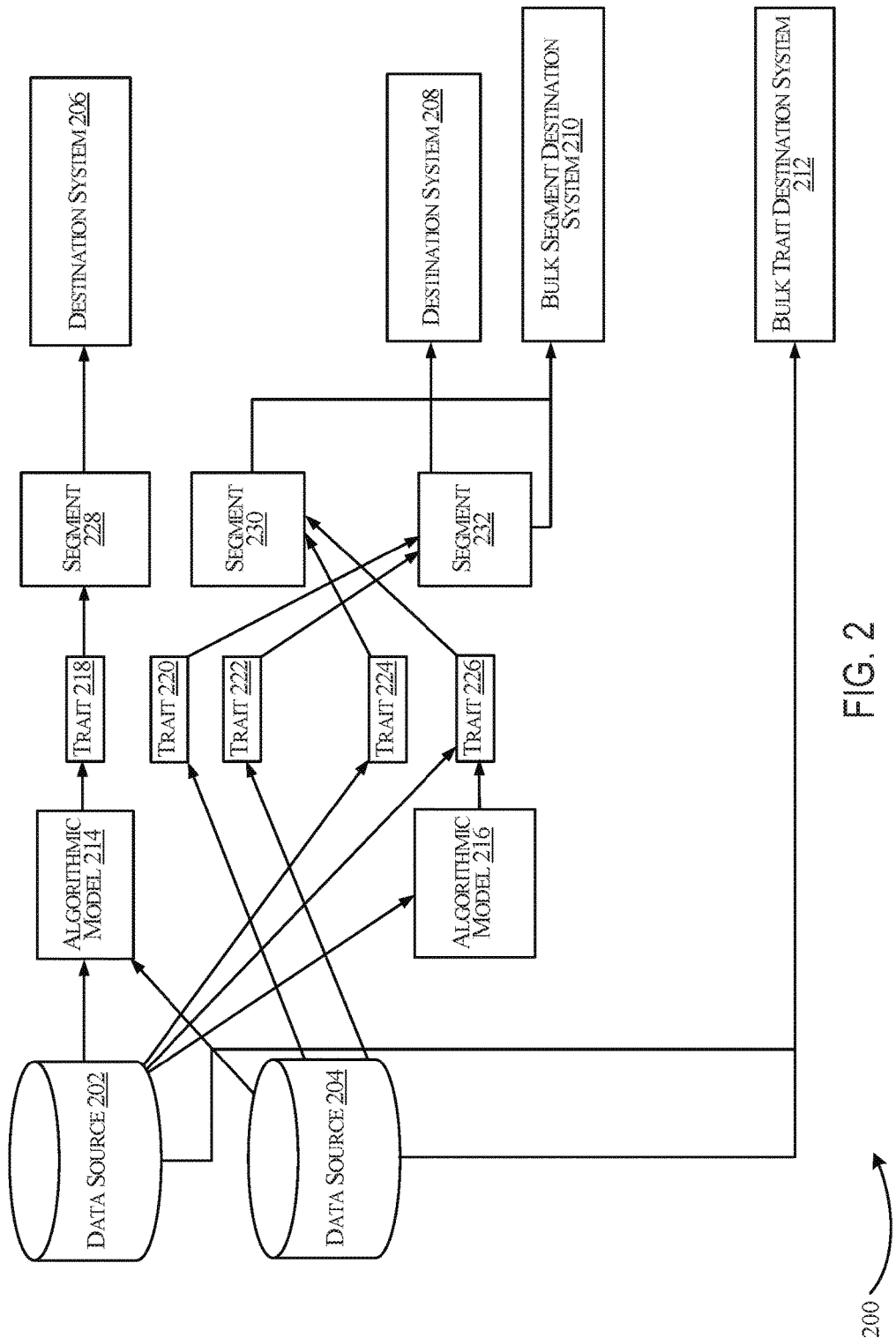
FIG. 2 is an example of an environment depicting multiple processes for data dissemination by the restriction compliance engine according to certain exemplary embodiments.

FIG. 2 is an example of an environment 200 depicting multiple data dissemination processes by the restriction compliance engine 102 according to certain exemplary embodiments.

In the example depicted in FIG. 2, data source 202 may be labelled with a set of restrictions (e.g., "ONSITE_AD_TARGETING" and "OFFSITE_AD_TARGETING") to indicate that data source 202 includes restrictions against onsite advertisement targeting and offsite advertisement targeting. Data source 204 may be labelled with a set of restrictions (e.g., "PII") to indicate restrictions related to the use of personally identifiable information. The destination system 206 may be associated with the label "ONSITE_AD_TARGETING" to indicate that the destination system 206 performs onsite advertisement targeting activities. The destination system 208 may be associated with the label "PII" to indicate that the destination system 208 performs activities related to personally identifiable information. The bulk segment destination system 210 may be associated with the label "OFFSITE_AD_TARGETING" to indicate that the bulk segment destination system 210 performs activities that include offsite advertisement targeting. The destination system 212 may be associated with the label "PII" to indicate that the destination system 212 performs a set of activities that includes matching a user with data collected about the user using personally identifiable information.

In some embodiments, one or more algorithmic models 214, 216 are used to retrieve data for dissemination to data sources. An algorithmic model includes one or more parameters and may include a query against a data set (e.g., data stored in data source 202) to identify traits that correspond to parameters of the model. Traits that are identified using an algorithmic model are subject to the set of restrictions associated with each data source that contributes to the model.

For example, the algorithmic model 214 may include a parameter identifying a trait or a segment (e.g., first-party users who have viewed a particular advertisement), and a number of parameters identifying multiple data sources (e.g., data source 202 and data source 204). The restriction compliance engine 102 uses the algorithmic model 214 to identify trait 218. Thus, trait 218 includes data (e.g., data related to a 25-35 year old person) that matches the parameters of the algorithmic model 214. The restriction compliance engine 102 (or an application that includes or uses the restriction compliance engine 102) is used to label the trait 218 as having the same set of restrictions as a union of the restrictions on data source 202 and the restrictions on data source 204 (e.g., "PII," "ONSITE_AD_TARGETING" and "OFFSITE_AD_TARGETING"). Trait 218 is associated with segment 228, which is subject to at least the restrictions of the data sources 202 and 204 from which data include the trait 218 was received.

In another example, the algorithmic model 216 may include a parameter identifying a trait (e.g., people that live in New York City), and a parameter identifying a single data source (e.g., data source 202). The restriction compliance engine 102 uses the algorithmic model 216 to identify trait 226 from data source 202. Thus, trait 226 includes data that matches the parameters of the algorithmic model 216. In this example, the trait 226 corresponds to data related to a resident of New York City. The restriction compliance engine 102 labels the trait 226 as having the same set of restrictions as data source 202 from which the trait 226 was received (e.g., "PII"). Trait 226 is associated with segment 230, which is subject to at least the restrictions of the data source 202 from which the trait 226 was received.

In additional or alternative embodiments, the restriction compliance engine 102 is used to manually identify (without using an algorithmic model) traits 220, trait 222, and trait 224. The restriction compliance engine 102 is used to associate trait 220 and trait 222 with segment 232. Similarly, the restriction compliance engine 102 is used to associate trait 224 and trait 226 with segment 230. Traits that are not identified using an algorithmic model are subject to the set of restrictions associated with the data source from which the trait originates.

In some embodiments, the restriction compliance engine 102 receives a request to disseminate segment 228 to destination system 206. In response to receiving such a request, the restriction compliance engine 102 determines a set of restrictions associated with the segment 228. For example, the restriction compliance engine 102 identifies each trait of the segment. For traits obtained from an algorithmic model, the restriction compliance engine 102 determines restrictions for each data source contributing to the model. For instance, the restriction compliance engine 102 identifies data source 202 from a parameter of the algorithmic model 214 that specifies one or more data sources for a query of the algorithmic model 214. The restriction compliance engine 102 associates a superset of those restrictions to the traits obtained from the algorithmic model. For traits that are not identified using an algorithmic model, the restriction compliance engine 102 associates the trait with the set of restrictions associated with the data source of the trait. The restriction compliance engine 102 labels the segment 228 with a set of restrictions corresponding to a superset of restrictions generated by combining sets of restrictions identified for each trait in the segment 228. Thus, segment 228 is associated with PII, ONSITE_AD_TARGETING, and OFFSITE_AD_TARGETING because data source 202 and data source 204 are identified as data sources in the algorithmic model 214, the algorithmic model 214 identifies trait 218, and trait 218 is included in segment 228.

In some embodiments, as part of processing the request to disseminate the segment 228 to the destination system 206, the restriction compliance engine 102 performs a comparison (e.g., a union) of the set of restrictions of the segment 228 and the set of activities associated with the destination system 206. The comparison indicates that disseminating the segment 228 to the destination system 206 will result in a violation of a restriction on onsite advertisement targeting. Accordingly, the restriction compliance engine 102 blocks the dissemination of the segment 228 to the destination system 206. If a violation was not indicated by the comparison, the restriction compliance engine 102 updates a mapping (e.g., mapping 124 depicted in FIG. 1) to indicate that data from the segment 228 may be disseminated to the destination system 206.

As another example, the restriction compliance engine 102 receives a request to disseminate segment 232 to destination system 208. Upon receiving such a request, the restriction compliance engine 102 determines a set of restrictions associated with the segment 232. For example, the restriction compliance engine 102 identifies each trait of the segment (trait 220 and trait 222). The restriction compliance engine 102 identifies a set of restrictions for each trait by identifying the data source that contributed the trait (in this case, the data source 204 contributed both the trait 220 and the trait 222). The restriction compliance engine 102 associates the segment 232 as having a set of restrictions corresponding to a superset of the set of restrictions for the identified data sources. Thus, the segment 232 is associated with a "PII" restriction because the trait 220 and the trait 222 originate from the data source 204. The restriction compliance engine 102 compares (e.g., performs an intersection of) the set of restrictions associated with the segment 232 and the set of activities associated with the destination system 208. The intersecting set includes the label "PII." Thus, the intersecting set indicates to the restriction compliance engine 102 that disseminating the segment 232 to the destination system 208 will result in a restriction violation based on personally identifiable information. Accordingly, the restriction compliance engine 102 blocks the dissemination of the segment 232 to the destination system 208. If a violation was not indicated by the comparison, the restriction compliance engine 102 would update a mapping indicating that disseminating data from the segment 232 to the destination system 208 will not cause any restriction violations.

In some embodiments, the restriction compliance engine 102 enables a user to perform a bulk dissemination of multiple segments to one or more destinations. For example, the restriction compliance engine 102 determines, based on the inclusion of trait 224 and trait 226 from data source 202, that the segment 230 is associated with restrictions on onsite advertisement targeting and offsite advertisement targeting. The restriction compliance engine 102 also determines that the segment 232 is associated with restrictions on personally identifiable information in the manner above. The restriction compliance engine 102 determines that the bulk segment destination system 210 is associated with activities including offsite advertisement targeting. By comparing the restrictions of the segment 230 to the activities of the bulk segment destination system 210, the restriction compliance engine 102 determines that restriction violations would occur if data included in the segment 230 were to be disseminated to the bulk segment destination system 210.

By comparing the restrictions of the segment 232 to the activities of the bulk segment destination system 210, the restriction compliance engine 102 determines that restriction violations would not occur if data included in the segment 232 were to be disseminated to the bulk segment destination system 210. Accordingly, the restriction compliance engine 102 blocks the segment 230 from being disseminated to the bulk segment destination system 210, but allows the segment 232 to be disseminated to the bulk segment destination system 210. Additionally, the restriction compliance engine 102 updates a mapping (e.g., mapping 124 of FIG. 1) to indicate that disseminating data from the segment 232 to the bulk segment destination system 210 will not cause restriction violations.

In some embodiments, the restriction compliance engine 102 blocks a user interface option for requesting data dissemination if the dissemination will cause a restriction violation. For example, the restriction compliance engine 102 (or an application that includes or uses the restriction compliance engine 102) may prevent a user from creating a mapping of a segment to a destination that would result in a violation if the segment data were to be disseminated to the destination.

In additional or alternative embodiments, the restriction compliance engine 102 provides an option (e.g., a selectable user interface option) that enables the user to initiate a request to disseminate data to bulk segment destination system 210, even if the restriction compliance engine 102 determines that a restriction violation will occur if the selected data is disseminated to the bulk segment destination system 210. Instead of blocking the mapping of a bulk selection parameter, the mapping is allowed to occur and the restriction engine 210 filters segments from the bulk mapping that would violate restrictions. In one example, upon receiving a request to disseminate data to the bulk segment destination system 210, the restriction compliance engine 102 consults mapping 124 and determines whether any of the mappings to the bulk segment destination system 210 would violate a usage policy. For example, the mapping 124 may include a mapping entry related to segments 230, 232 and the bulk segment destination system 210. If the restriction compliance engine 102 determines that segment 230 may be disseminated without a violation but that dissemination of segment 232 to the bulk segment destination would cause a violation, the restriction compliance engine 102 can allow data from the segment 230 to be disseminated but block the dissemination of data from the segment 232.

In some embodiments, the restriction compliance engine 102 enables a user to perform a bulk dissemination of multiple traits from multiple data sources to one or more destinations. For example, the restriction compliance engine 102 receives a request to disseminate traits from the data source 202 and the data source 204. The data source 202 is associated with restrictions on onsite advertisement targeting and offsite advertisement targeting. The data source 204 is associated with restrictions on personally identifiable information. Given that the bulk segment destination system 210 is associated with activities including personally identifiable information, restrictions violations would occur if traits from the data source 204 were disseminated to the bulk trait destination system 212.

For example, upon a request for bulk dissemination of traits from the data source 202 and the data source 204, the restriction compliance engine 102 identifies the set of restrictions for each data store for which traits are being disseminated. The restriction compliance engine 102 determines whether the set of restrictions for a particular data source will cause restriction violations if traits from the data source were to be disseminated to the destination. For example, the set of restrictions associated with data source 202 may be compared to the set of activities associated with the bulk trait destination system 212. The restriction compliance engine 102 determines that no violation will occur given that the set of restrictions for the data source 202 and the set of activities for the bulk trait destination system 212 do not overlap. Accordingly, the restriction compliance engine 102 determines that the traits from the data source 202 can be disseminated to the bulk trait destination system 212.

The restriction compliance engine 102 determines whether the set of restrictions associated with the data source 204 will cause a restrictions violation by comparing the set of restrictions associated with the data source 204 and the set of activities associated with the bulk trait destination system 212. The restriction compliance engine 102 determines that a violation will occur given that the set of restrictions for the data source 204 and the set of activities for bulk trait destination system 212 overlap. Accordingly, the restriction compliance engine 102 determines that the traits from data source 204 cannot be disseminated to bulk trait destination system 212, but allows data from the data source 202 to be disseminated to the bulk trait destination system 212.

FIG. 3 is a diagram depicting an example of an interface 300 provided by the restriction compliance engine 102 for obtaining a set of restrictions to be associated with a data source. In some embodiments, the interface 300 includes a section 302 for defining data source details. The section 302 includes (but is not limited to) field 304, field 306, field 308, drop-down menu 310, and drop-down menu 312. The restriction compliance engine 102 provides the field 304 to enable the user to input an alphanumeric name for the data source. The field 306 is utilized to indicate an integration code for the data source. The restriction compliance engine 102 provides the field 308 to enable the user to provide a description of the data source. The restriction compliance engine 102 provides the drop-down menu 310 to enable the user to provide a marketing cloud visitor ID version. The restriction compliance engine 102 provides the drop-down menu 312 to enable the user to provide an ID type.

The interface 300 depicted in FIG. 3 is provided for illustrative purposes only. In some embodiments, more interface elements (edit boxes, fields, radio buttons, drop-down menus, and the like) may be included in the section 302 than the number depicted in FIG. 3. In other embodiments, fewer interface elements may be included in the section 302 than the number depicted in FIG. 3.

In some embodiments, the interface 300 includes a section 314 for defining data export controls for data originating from the data source of the section 302. For example, the restriction compliance engine 102 may receive a user-specified set of restrictions utilizing check boxes 316. The set of restrictions includes any combination of restrictions including "no restrictions," "cannot be tied to personally identifiable information," "cannot be used for site ad targeting," "cannot be used for offsite ad targeting," and/or "cannot be used for onsite personalization." It should be appreciated that the restriction compliance engine 102 may provide the interface 300 to obtain information about restrictions for the data source, or the restriction compliance engine 102 may obtain information about restrictions for the data source from another source.

FIG. 4 is a diagram depicting an example of an interface 400 for obtaining, by the restriction compliance engine 102, information related to set of activities to be associated with a destination according to certain exemplary embodiments. In some embodiments, the interface 400 includes a section 402 for defining destination details. The section 402 includes (but is not limited to) field 404, field 406, selector 408, selector 410, and check box 412. The restriction compliance engine 102 provides the field 404 to enable the user to provide an alphanumeric name for the destination. The selector 408 is used to identify a platform for the destination. The selector 410 is used to identify a type with which to associate the destination. The check box 412 is utilized to select an auto-fill destination mapping option.

The interface 400 depicted in FIG. 4 is provided for illustrative purposes only. In some embodiments, more interface elements (edit boxes, fields, radio buttons, drop-down menus, and the like) may be included in the section 402 than the number depicted in FIG. 4. In other embodiments, less interface elements may be included in the section 402 than the number depicted in FIG. 4.

In some embodiments, the interface 400 includes a section 414 for defining a set of activities for the destination indicated in the section 402. For example, the restriction compliance engine 102 may receive a user-specified set of activities for a destination utilizing the check boxes 416. For example, the check boxes 416 may be used to indicate any combination of activities performed by a destination. For example, the check boxes 416 may be used to indicate that the destination performs activities that use data that "contains identifiable information," activities that use data "for onsite ad targeting," activities that use data "for offsite ad targeting," and activities that use data "for onsite personalization." It should be appreciated that the restriction compliance engine 102 may provide the interface 400 to identify a set of activities for a destination, or the restriction compliance engine 102 may obtain information from another source that identifies the destination's activities.

Figure 5:
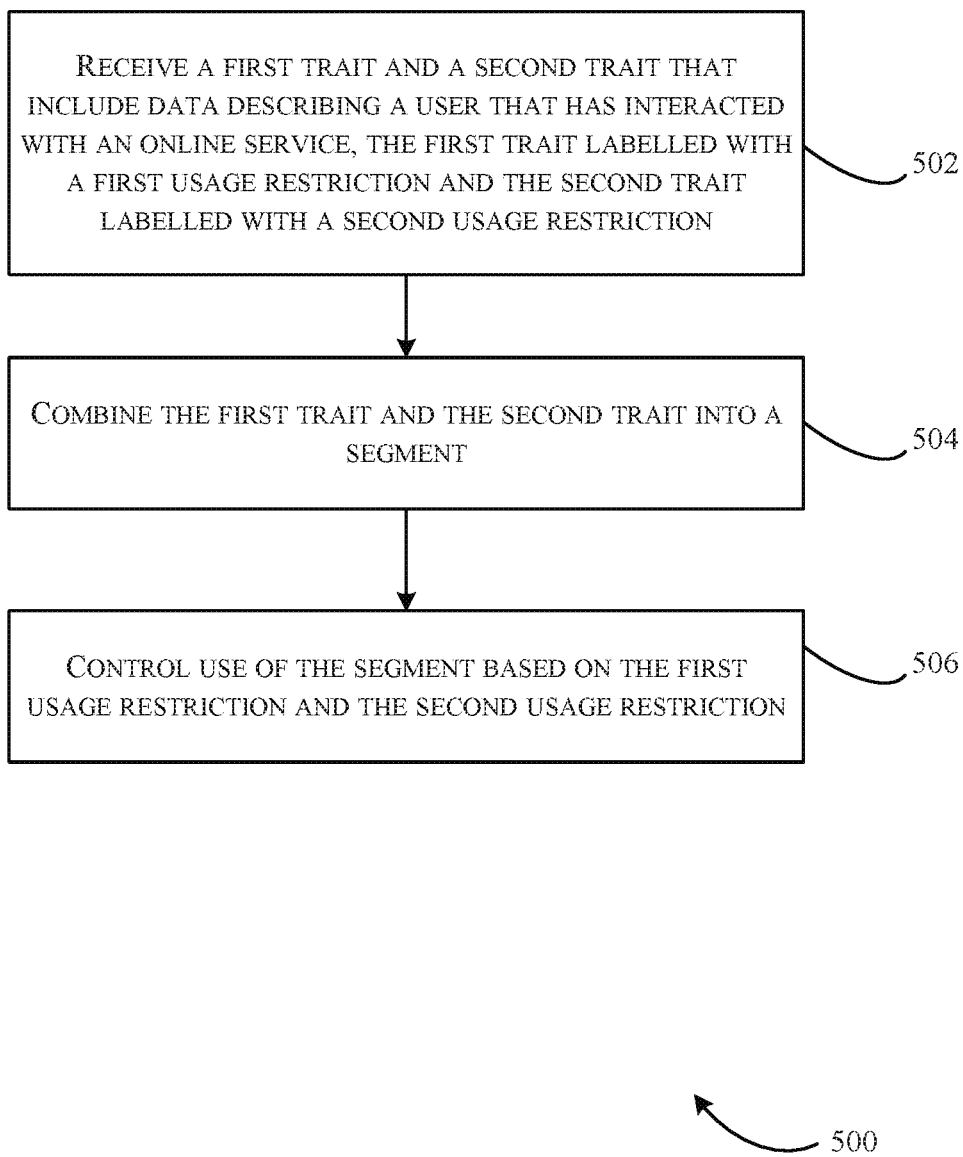
FIG. 5 is a flow chart depicting an example of an algorithm for controlling use of a segment according to certain exemplary embodiments.

FIG. 5 is a flow chart depicting an example of an algorithm 500 for controlling use of a segment. In some embodiments, the operations depicted in FIG. 5 are implemented by using one or more processing devices to execute suitable program code that includes the restriction compliance engine 102 and to thereby configure the processing devices to perform the operations described herein. For illustrative purposes, the algorithm 500 is described using the implementations described above with respect to FIGS. 1-4. Other implementations, however, are possible.

At block 502, the restriction compliance engine 102 receives a first trait and a second trait that include data describing a user that has interacted with an online service. For example, the first trait is labelled with a first usage restriction (e.g., "PII") and the second trait is labelled with a second usage restriction (e.g., "ONSITE_AD_TARGETING") that is different from the first usage restriction.

In some embodiments, the restriction compliance engine 102 receives the first and second traits with data that has been transmitted to a system executing the restriction compliance engine 102 via a network 106. For example, the restriction compliance engine 102 may receive the traits 112, 114 from the data sources 104, 108. The labeling of the traits 112, 114 with the usage restrictions may result from the data sources 104, 108 being labeled with those usage restrictions. For example, if the data source 104 is labeled with a first usage restriction (e.g., "PII"), the trait 112 is labeled with the same usage restriction by virtue of the trait 112 being received from the data source 104. Likewise, if the data source 108 is labeled with a second usage restriction (e.g., "ONSITE_AD_TARGETING"), the trait 114 is labeled with the same usage restriction by virtue of the trait 114 being received from the data source 108.

In some embodiments, the traits 112 and 114 are labelled based on corresponding labels that have been applied to the data sources 104 and 108. In one example, prior to receiving the traits 112 and 114, the restriction compliance engine 102 may receive inputs via the interface 300 indicating that the data source 104 is to be labelled with the "PII" restriction and the data source 108 is to be labelled with the "ONSITE_AD_TARGETING" restriction. The traits 112 and 114 are therefore labelled with these respective restrictions because the restriction compliance engine 102 received these traits from the data sources 104 and 108.

At block 504, the restriction compliance engine 102 combines the first trait and the second trait into a segment. The segment includes at least the first trait and the second trait, although additional traits may be included in the segment. In one example, the restriction compliance engine 102 stores the traits 112, 114 received from the data sources 104, 108 in a segment 110, such as (but not limited to) a database stored in a non-transitory computer-readable medium.

At block 506, the restriction compliance engine 102 controls use of the segment based on the first usage restriction and the second usage restriction. For example, the restriction compliance engine 102 determines, using the first usage retraction, that disseminating the first trait does not cause restriction violations. Similarly, the restriction compliance engine 102 determines, using the second usage restriction, that disseminating the second trait causes restriction violations. Accordingly, the restriction compliance engine 102 provides, to a destination, information related to the first trait, but restricts information related to the second trait.

In additional or alternative embodiments, the restriction compliance engine 102 associates the segment 110 with a combined set of restrictions associated with data sources 104 and 108, from which the traits 112 and 114 were received. In one example, the restriction compliance engine 102 associates the segment 110 with both the "PII" restriction and the "ONSITE_AD_TARGETING" restriction because trait 112 was received from the data source 104 (e.g., the data source labeled with the "PII" restriction) and trait 114 was received from the data source 108 (e.g., the data source labeled with the "ONSITE_AD_TARGETING" restriction).

Figure 6:
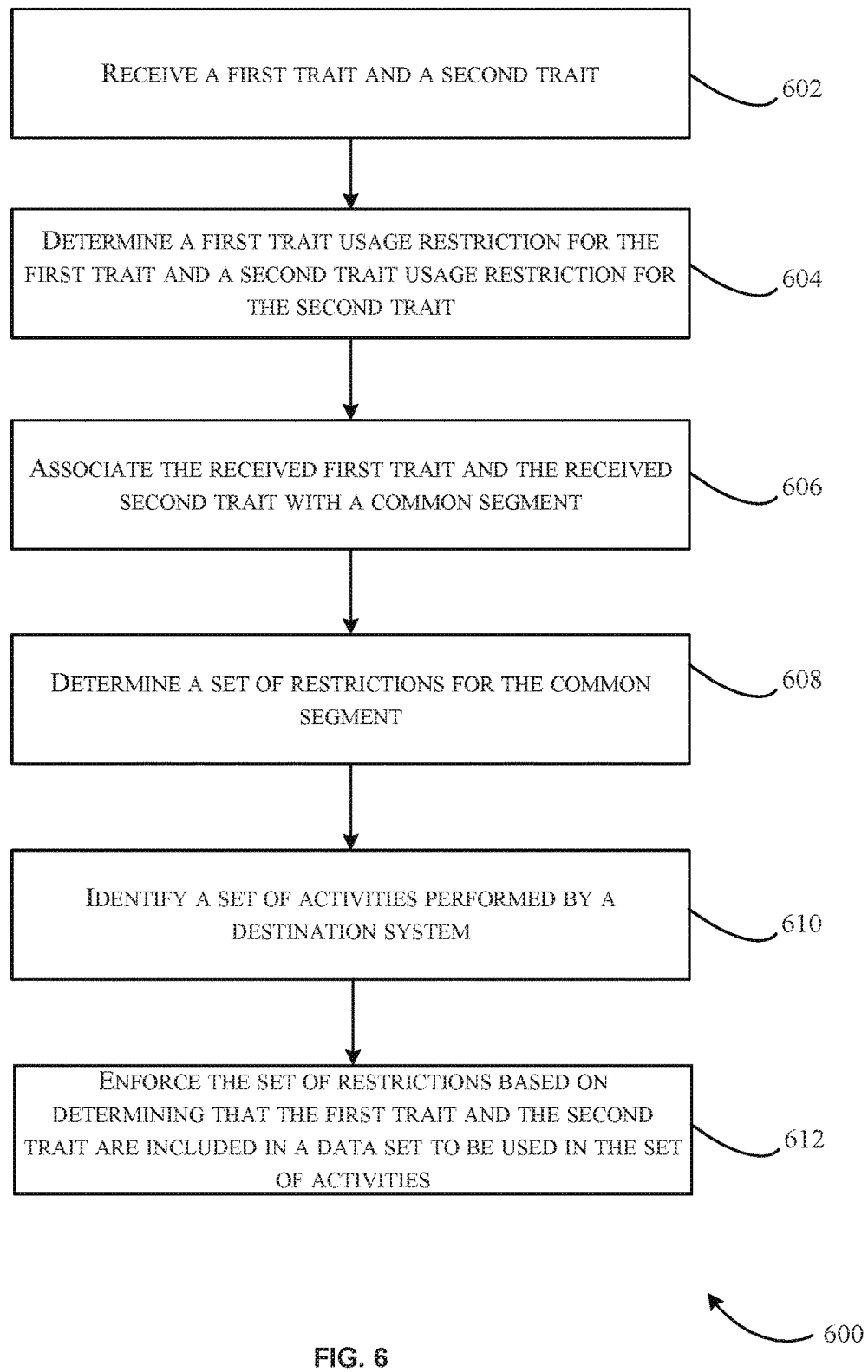
FIG. 6 is a flow chart depicting an example of an algorithm for enforcing restrictions when determining if a segment should be allowed to be disseminated to a destination according to certain exemplary embodiments.

For instance, FIG. 6 is a flow chart depicting an example of an algorithm 600 for determining whether restrictions should be enforced for segment data with respect to a particular destination according to certain exemplary embodiments. In some embodiments, the operations depicted in FIG. 6 are implemented by using one or more processing devices to execute suitable program code that includes the restriction compliance engine 102 and to thereby configure the processing devices to perform the operations described herein. For illustrative purposes, the algorithm 600 is described using the implementations described above with respect to FIGS. 1-4. Other implementations, however, are possible.

At block 602, the restriction compliance engine 102 receives a first trait from a first data source and a second trait from a second data source. Each of the first trait and the second trait describes one or more interactions by a user with an online service in communication with the respective first and second data sources. In one example, a trait 112 includes data that was collected by a first online service about interaction with content provided by the first online service and that was stored in the data source 104. A trait 114 includes data that was collected by a first online service about interaction with content provided by the first online service and that was stored in the data source 108.

At block 604, the restriction compliance engine 102 determines a first trait usage restriction for the first trait based on receiving the first trait from the first data source and a second trait usage restriction for the second trait based on receiving the second trait from the second data source. For example, the restriction compliance engine 102 determines that a first data source 104 is associated with a set of restrictions indicating that data from the first data source 104 should not be used for onsite advertisement targeting or offsite advertisement targeting. In this case, the first trait usage restriction will indicate the same restrictions on the first trait 112. Similarly, the restriction compliance engine 102 determines that a second data source 108 is associated with a set of restrictions indicating that data from the second data source should not be used for personal identification. In this case, the second trait usage restriction will indicate the same restrictions on the second trait 114.

For example, the traits 112, 114 may be labeled usage restrictions based on the data sources 104, 108 being labeled with those usage restrictions. For example, if the data source 104 is labeled with a first usage restriction (e.g., "PII"), the trait 112 is labeled with the same usage restriction by virtue of the trait 112 being received from the data source 104. Likewise, if the data source 108 is labeled with a second usage restriction (e.g., "ONSITE_AD_TARGETING"), the trait 114 is labeled with the same usage restriction by virtue of the trait 114 being received from the data source 108.

At block 606, the restriction compliance engine 102 associates the first trait and the second trait with a common segment. For example, a segment 110 includes a data object where the first trait and the second trait are stored as attributes of the data object. In some embodiments, the segment 110 includes a database or mapping indicating one or more traits associated with the segment 110. The segment 110 is stored by the restriction compliance engine 102 in a suitable non-transitory computer-readable medium. The segment 110 includes a combined data set that includes data generated by the interactions of multiple users with multiple online services.

The restriction compliance engine 102 determines a set of restrictions for the common segment at block 608, wherein the set of restrictions is determined based on a combination of the first trait usage restriction and the second trait usage restriction. In some embodiments, the restriction compliance engine 102 identifies multiple data sources associated with the segment, where each of the identified data sources provided at least one trait that is included in the segment 110. In one example, a segment 110 includes traits 112 and 114, which were respectively received from the data sources 104 and 108. The restriction compliance engine 102 determines the set of restrictions for the segment 110 by treating the segment 110 as having any restriction that applies to at least one data source from which a trait was received. Thus, if data source 104 is associated with a restriction on personal information, and data source 108 is associated with a restriction on onsite personalization, then the restriction compliance engine 102 will treat the segment 110 as having a restriction on personal information and onsite personalization.

At block 610, the restriction compliance engine 102 identifies a set of activities performed by a destination system. In one example, the restriction compliance engine 102 identifies a set of activities performed by the destination system 126 in response to receiving a request 122 to disseminate data to the destination system 126.

At block 612, the restriction compliance engine 102 enforces the set of restrictions based on determining that the first trait and the second trait are included in the data set to be used in the set of activities. For example, the restriction compliance engine 102 enforces the set of restrictions by performing an intersection (or other comparison) of the set of restrictions for the common segment 110 (determined at block 608) and the set of activities for the destination system 126 (determined at block 610) to determine whether to allow or restrict dissemination of data from the segment 110 to the destination system 126.

In some embodiments, a mapping 124 is created or updated to identify whether dissemination from a segment 110 to a destination system 126 is permissible. The mapping 124 is created or updated based on the operations described above with respect to FIG. 6. In response to subsequent requests to disseminate data from the segment 110 to the destination system 126, the restriction compliance engine 102 may consult the mapping 124 to determine whether to allow the dissemination. The mapping 124 may remain valid so long as the restrictions associated with data sources (and their associated traits) and activities performed by destination systems remained unchanged. However, modifications to the restrictions, the activities, or both may require updates to the mapping 124 or other enforcement actions by the restriction compliance engine 102.

Figure 7:
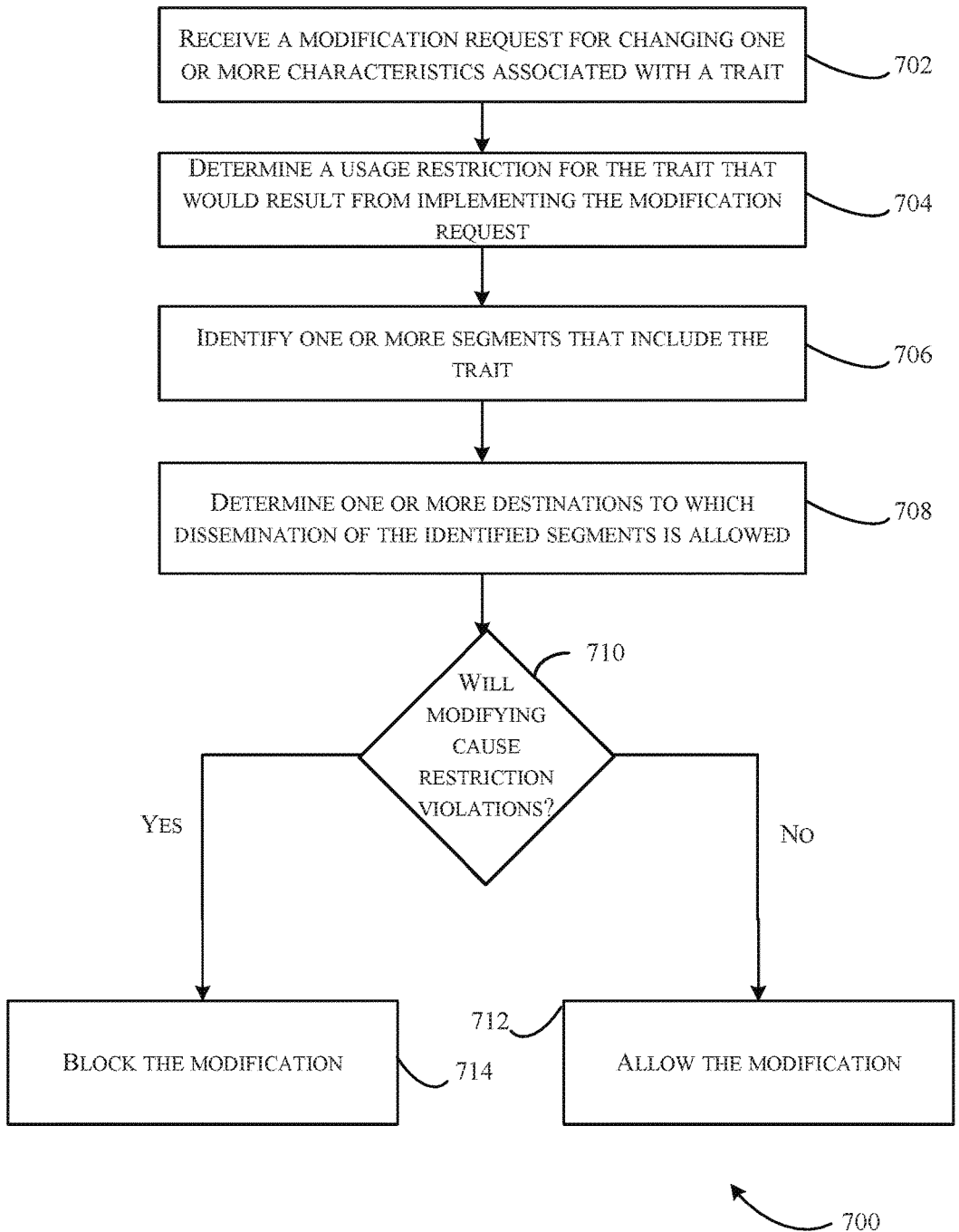
FIG. 7 is a flow chart depicting an example of an algorithm for enforcing restrictions when modifying a trait of a segment according to certain exemplary embodiments.

For example, FIG. 7 is a flow chart depicting an example of an algorithm 700 for enforcing restrictions when modifying a trait of a segment according to certain exemplary embodiments. In some embodiments, the operations depicted in FIG. 7 are implemented by using one or more processing devices to execute suitable program code that includes the restriction compliance engine 102 and to thereby configure the processing devices to perform the operations described herein. For illustrative purposes, the algorithm 700 is described using the implementations described above with respect to FIGS. 1-4. Other implementations, however, are possible.

At block 702, the restriction compliance engine 102 receives a modification request for changing one or more characteristics associated with a trait. For example, in the example depicted in FIG. 2, an algorithmic model 214 is used to retrieve data for the trait 218. The algorithmic model 214 specifies that the data source 202 is the source of this retrieved data for the trait 218. A modification request may include a request to modify the algorithmic model 214 such that the algorithmic model 214 specifies the data source 204 instead of or in addition to the data source 202 as the source of data for the trait 218.

At block 704, the restriction compliance engine 102 determines a usage restriction for the trait that would result from implementing the modification request. In the example provided above, the algorithmic model 214, prior to the requested modification, specifies data source 202. Therefore, without the requested modification to the trait 218, the trait 218 will include data labeled with the restrictions associated with the data source 202 (e.g., "PII"). If the algorithmic model 214 were updated to use the data source 204 as a source of data for the trait 218, then the trait 218 would include data labeled with the restrictions associated with the data source 204 (e.g., "ONSITE_AD_TARGETING").

At block 706, the restriction compliance engine 102 identifies one or more segments that include the trait. For example, in the example provided above, the restriction compliance engine 102 determines that the segment 228 includes the trait 218.

At block 708, the restriction compliance engine 102 determines one or more destination systems to which dissemination of the identified segments is allowed with implementing the modification request. For example, as depicted above in FIG. 1, a mapping 124 may indicate that the restriction compliance engine has previously verified that data from certain segments may be provided to certain destination systems without violating a usage restriction. In the example provided above that involves the trait 218 and the segment 228, such a mapping indicates that disseminating data about trait 218 from the segment 228 to the destination system 206 will not violate a usage restriction if the source of data for the trait 218 is the data source 202.

At decision block 710, the restriction compliance engine 102 determines whether modifying the trait according to the modification request will cause restriction violations. In the example provided above, the restriction compliance engine 102 compares a set of restrictions for the modified trait 218 (e.g., the restrictions on trait 218 that would result from using the data source 204 as a source of data for the trait 218) to the set of activities for a destination system determined at block 708 (e.g., the set of activities performed by the destination system 206). If the set of activities includes one or more activities involving the use of data in a manner that is prohibited by one or more of the restrictions, then a violation would occur if the modification were implemented.

At block 712, the restriction compliance engine 102 allows the modification if the set of restrictions does not cause a restriction violation. In the example provided above, if the destination system 206 does not use data having the trait 218 for any activity that would violate a restriction associated with the data source 204, then the restriction compliance engine 102 allows the modification. For example, the restriction compliance engine 102 implements the requested modification to the algorithmic model 214 such that the data source 204 is a source of data for the trait 218.

At block 714, the restriction compliance engine 102 blocks the modification if the set of restrictions for the modified trait would cause a restriction violation. In the example provided above, if the destination system 206 uses data having the trait 218 for at least one activity that would violate a restriction associated with the data source 204, then the restriction compliance engine 102 prevents the modification. For example, the restriction compliance engine 102 rejects the requested modification to the algorithmic model 214 that would cause the data source 204 to provide data for the trait 218 specified by the algorithmic model 214. In some embodiments, the restriction compliance engine 102 generates and transmits a message indicating the reason for the rejection.

Figure 8:
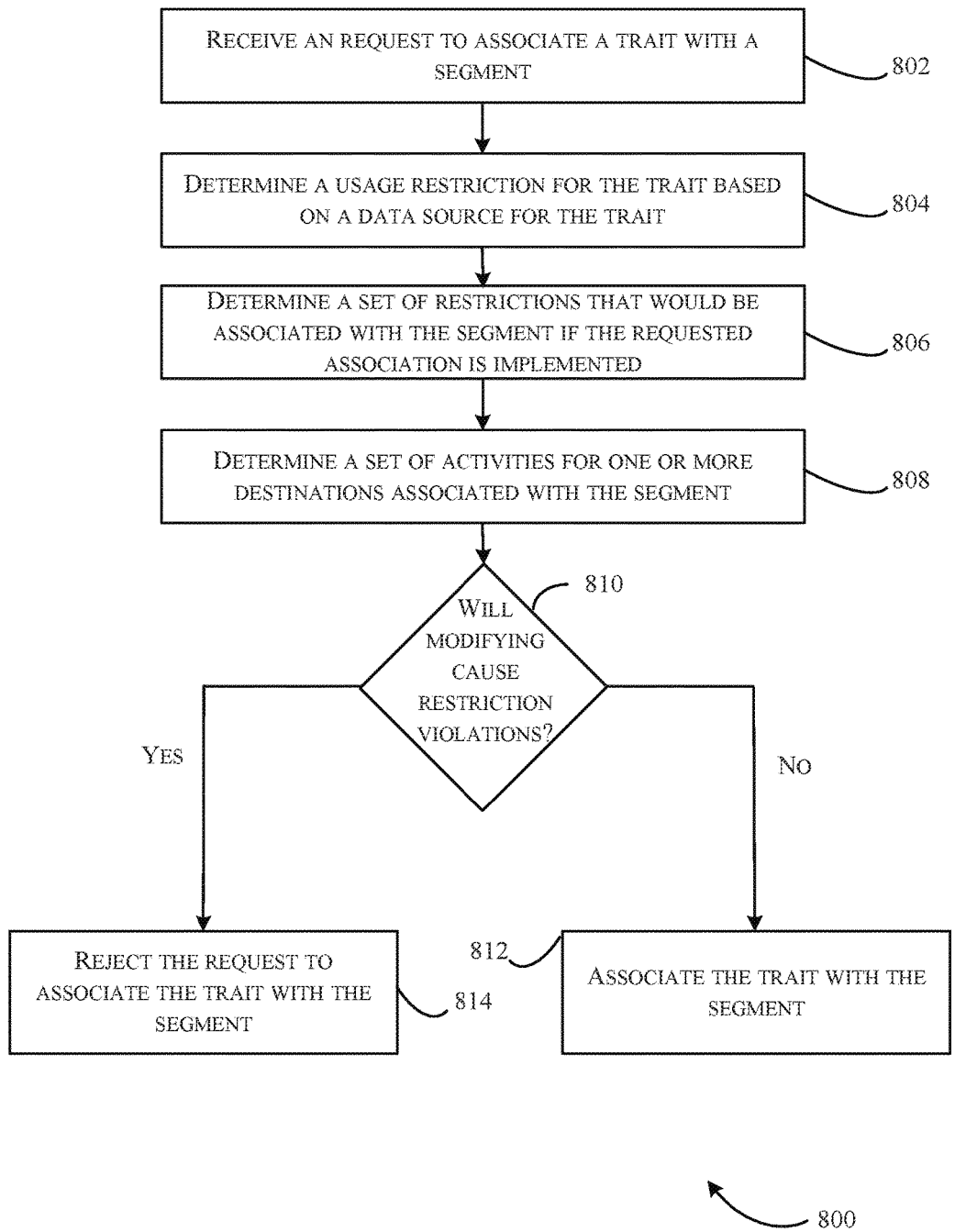
FIG. 8 is a flow chart depicting an example of an algorithm for enforcing restrictions when adding a trait to a segment according to certain exemplary embodiments.

In additional or alternative embodiments, the restriction compliance engine 102 prevents requested modifications to a segment from resulting in usage violations. For example, FIG. 8 is a flow chart depicting an example of an algorithm 800 for enforcing restrictions when adding a trait to a segment according to certain exemplary embodiments. In some embodiments, the operations depicted in FIG. 8 are implemented by using one or more processing devices to execute suitable program code that includes the restriction compliance engine 102 and to thereby configure the processing devices to perform the operations described herein. For illustrative purposes, the algorithm 800 is described using the implementations described above with respect to FIGS. 1-4. Other implementations, however, are possible.

At block 802, the restriction compliance engine 102 receives a request to associate a trait with a segment. For instance, in the example depicted in FIG. 2, the segment 232 is associated with the traits 220 and 222. The restriction compliance engine 102 may receive a request to associate the segment 232 with the trait 224 in addition to or instead of the traits 220 and 222.

At block 804, the restriction compliance engine 102 determines a usage restriction for the trait based on a data source for the trait. In the example provided above, the restriction compliance engine 102 determines that the trait 224 has a certain usage restriction (e.g., a restriction on onsite advertisement targeting) based on the data source 202 being a source of the trait 224.

At block 806, the restriction compliance engine 102 determines a set of restrictions that would be associated with the segment if the requested association were to be implemented. In the example provided above, the restriction compliance engine 102 identifies the restrictions associated with the traits 220 and 222, which are currently associated with the segment 232, and the restrictions associated with the trait 224, which would be associated with the segment 232 if the requested association were to be implemented.

At block 808, the restriction compliance engine 102 determines a set of activities for one or more destination systems associated with the segment. In the example provided above, the restriction compliance engine 102 may access a mapping or other suitable data that identifies a set of activities performed by the destination system 208 and the bulk segment destination system 210. Each of these destination systems (according to the mapping) receives data having the traits associated with the segment 232.

At block 810, the restriction compliance engine 102 determines whether associating the trait with the segment will result in a set of restrictions for the segment that causes restriction violations. For example, the restriction compliance engine 102 compares a resultant set of restrictions for the segment 232 (as determined at block 806) to the set of activities for the destination system 208 and the bulk segment destination system 210 (as determined at block 810).

At block 812, the restriction compliance engine 102 associates the trait with the segment if the determination at block 810 indicates that the resultant set of restrictions for the segment does not result in any restriction violations. For example, the restriction compliance engine 102 may determine that the destination system 208 and the bulk segment destination system 210 do not perform any activities that violate restrictions associated with the data source 202. Based on this determination, the restriction compliance engine 102 associates the trait 224 with the segment 232.

At block 814, the restriction compliance engine 102 rejects the request to associate the trait with the segment based on a determination at block 810 indicating that the resultant set of restrictions for the trait would result in a restriction violation. For example, if one or more of the destination system 208 and the bulk segment destination system 210 performs at least one activity that violates restrictions associated with the data source 202, then the restriction compliance engine 102 prevents the trait 224 from being associated with the segment 232. In some embodiments, the restriction compliance engine 102 generates and transmits a message indicating that the requested association was rejected.

In additional or alternative embodiments, additional restrictions may be applied to a data source after the restriction compliance engine 102 has determined that a destination system does not violate an earlier set of restrictions. For example, at a first point in time, the restriction compliance engine 102 may determine that a data source 104 is not associated with any restrictions that prevent the permissible dissemination of data having a trait 112 (e.g., data received from the data source 104) from a segment 110 to a destination system 126. Based on this determination, the restriction compliance engine 102 generates or updates a mapping 124 indicating that dissemination of data from segment 110 to the destination system 126 does not violate any usage restrictions. However, at a second point in time, the restriction compliance engine 102 may be used to label the data source 104 as being associated with a restriction that prohibits dissemination of data having a trait 112 (e.g., data received from the data source 104) from a segment 110 to a destination system 126. The restriction compliance engine 102 performs one or more corrective actions to ensure that the modified restrictions associated with the data source 104 are enforced with respect to the segment 110.

Figure 9:
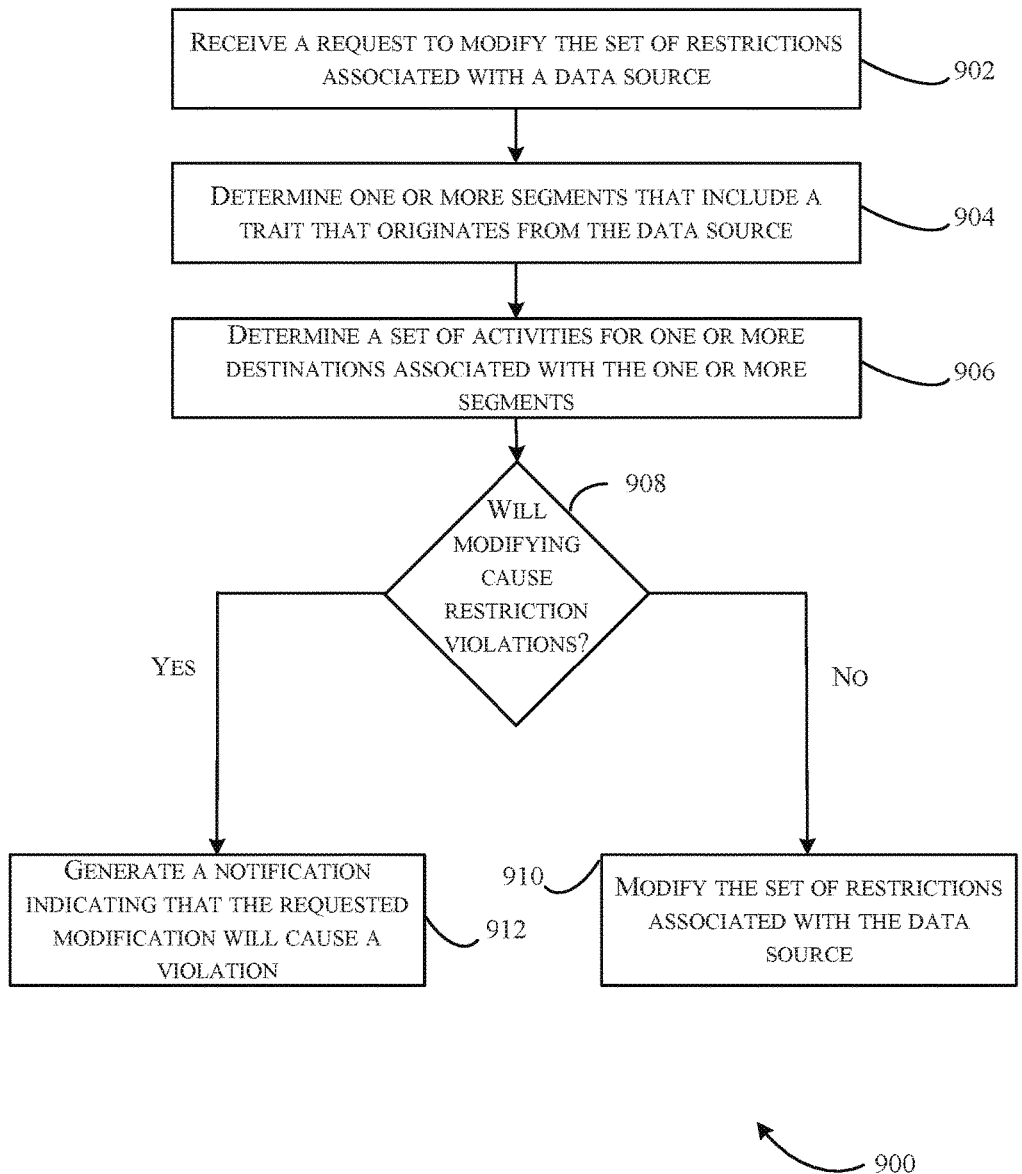
FIG. 9 is a flow chart depicting an example of an algorithm for enforcing restrictions when changing restrictions of a data source according to certain exemplary embodiments.

For example, FIG. 9 is a flow chart depicting an example of an algorithm 900 for enforcing restrictions when changing restrictions of a data source according to certain exemplary embodiments. In some embodiments, the operations depicted in FIG. 9 are implemented by using one or more processing devices to execute suitable program code that includes the restriction compliance engine 102 and to thereby configure the processing devices to perform the operations described herein. For illustrative purposes, the algorithm 900 is described using the implementations described above with respect to FIGS. 1-4. Other implementations, however, are possible.

At block 902, the restriction compliance engine 102 receives a request to modify a set of restrictions associated with a data source. For example, a mapping 124 may have been generated prior to executing block 902 based on verifying that the data source 104 does not impose PII-based restrictions on data collected from the data source 104. However, the request received at block 902 may include a request to label the data source 104 with the "PII" label.

At block 904, the restriction compliance engine 102 identifies one or more segments that include a trait that originates from the data source. In the example provided above, the restriction compliance engine 102 determines that the segment 110 includes the trait 112 and that data with the trait 112 is collected from the data source 104.

At block 906, the restriction compliance engine 102 determines a set of activities performed by one or more destination systems that are associated with the identified segments. In the example provided above, the restriction compliance engine 102 refers to the mapping 124 and thereby determines that the destination system 126 performs one or more activities that use data disseminated from the segment 110.

At decision block 908, the restriction compliance engine 102 determines whether the requested modification to the data source's set of restrictions will result in restriction violations with respect to the set of activities for the identified destination systems. In the example provided above, the restriction compliance engine 102 determines whether the destination system 126 performs one or more activities that use personally identifiable information to match collected data with specific users (i.e., that use data from the segment 110 in a manner that violates the usage restriction requested at block 902). If so, a violation would occur if the restrictions associated with the data source 104 are modified as requested. If not, a violation would not occur if the restrictions associated with the data source 104 are modified as requested.

At block 910, the restriction compliance engine 102 modifies the set of restrictions associated with the data source if the requested modification to the set of restrictions associated with the data source will not cause a restriction violation. For example, if the destination system 126 does not perform any activities that use personally identifiable information to match collected data with specific users (i.e., that use data from the segment 110 in a manner that violates the usage restriction requested at block 902), a violation of a usage restriction would not occur if data is disseminated from the segment 110 to the destination system 126. The data source 104 can therefore be labeled with the "PII" restriction without invalidating the mapping 124 (i.e., by disseminating data from the segment 110 in a manner that violates the new usage restriction).

At block 912, the restriction compliance engine 102 generates a notification in response to the request if the requested modification will cause restriction violation with respect to the set of activities for the identified destination systems. For example, if the destination system 126 performs one or more activities that use personally identifiable information to match collected data with specific users (i.e., that use data from the segment 110 in a manner that violates the usage restriction requested at block 902), then the request modification to the restrictions associated with the data source 104 would invalidate the mapping 124. Prior to implementing the requested modification, the restriction compliance engine 102 generates a notification indicating the potential violation.

For example, the notification may indicate that the proposed modification to the restrictions will impermissibly cause data from the segment 110 to be disseminated to the destination system 126. The notification may include one or more suggestions for addressing the potential violation. For instance, the restriction compliance engine 102 may recommend removing an association between the data source 104 and the segment 110. By removing the association between the data source 104 and the segment 110, the data source 104 will no longer contribute data to the segment 110, thereby allowing the data source 104 to be labeled with the "PII" restriction without resulting in the dissemination of PII-restricted data to the destination system 126 if that data is collected from the data source 104.

Figure 10:
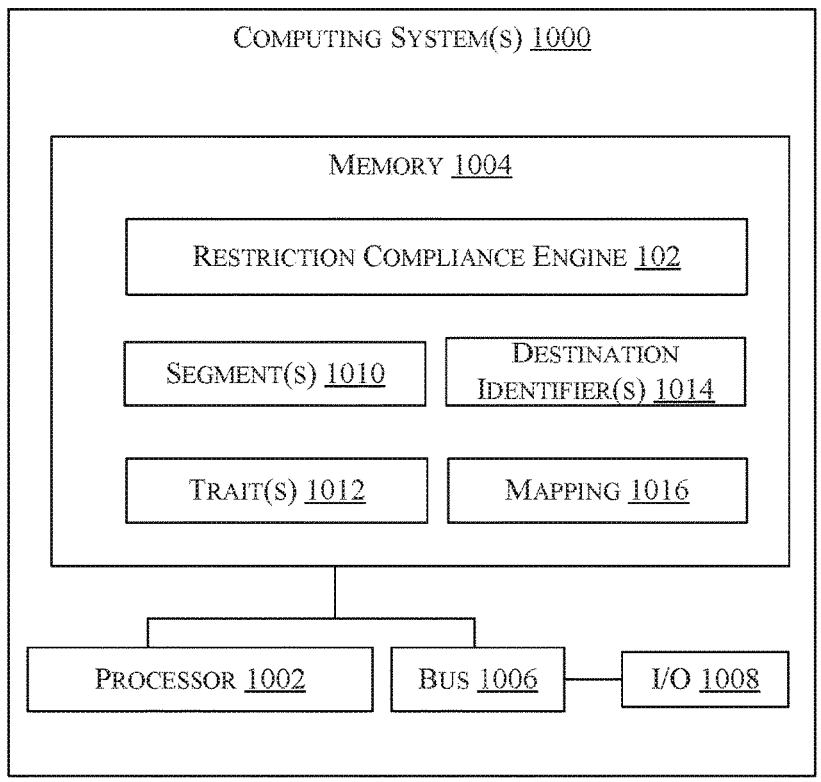
FIG. 10 is a flow chart depicting an example of an algorithm for enforcing restrictions when changing a data source associated with a trait according to certain exemplary embodiments.

Any suitable computing system or group of computing systems can be used for enforcing restrictions for data collected from various data sources. For example, FIG. 10 is a block diagram depicting an example of a computing system 1000 that executes a restriction compliance engine 102 for enforcing usage policies for data dissemination.

The computing system 1000 includes a processor 1002 that is communicatively coupled to a memory 1004 and that executes computer-executable program code and/or accesses information stored in the memory 1004. Examples of the processor 1002 include (but are not limited to) a microprocessor, an application-specific integrated circuit ("ASIC"), a field-programmable gate array ("FPGA"), or other processing device. The processor 1002 can include any number of processing devices, including one.

The memory 1004 includes any suitable non-transitory computer-readable medium. In various embodiments, the computer-readable medium includes any electronic, optical, magnetic, or other storage device capable of providing a processor with computer-readable instructions or other program code. Non-limiting examples of a computer-readable medium include a CD-ROM, a DVD, a magnetic disk, a memory chip, a ROM, a RAM, an ASIC, optical storage, magnetic tape or other magnetic storage, or any other medium from which a computer processor can read instructions.

The computing system 1000 may also include a number of external or internal devices such as input or output devices. For example, the computing system 1000 is shown with an input/output ("I/O") interface 1007 that can receive input from input devices or provide output to output devices. A bus 1006 can also be included in the computing system 1000. The bus 1006 can communicatively couple one or more components of the computing system 1000.

The computing system 1000 executes program code that configures the processor 1002 to perform one or more of the operations described above with respect to FIGS. 2-10. The memory 1004 stores this program code. The program code includes, for example, the restriction compliance engine 102 or other suitable engine, module, or application that can be used to enforce restrictions associated with data. The program code may be resident in the memory 1004 or any suitable computer-readable medium and may be executed by the processor 1002 or any other suitable processor. In some embodiments, the program code includes processor-specific instructions generated by a compiler and/or an interpreter from code written in any suitable computer-programming language, including, for example, C, C++, C#, Visual Basic, Java, Python, Perl, JavaScript, and ActionScript.

In some embodiments, one or more segments 1010, one or more traits 1012, one or more destination identifiers 1014, and one or more mappings 1016 are stored in the memory 1004, as depicted in FIG. 10. In other embodiments, one or more of the segments 1010, the traits 1012, the destination identifiers 1014, and the mappings 1016 are stored in one or more memory devices accessible via a data network, such as a memory device accessible via a cloud service.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for controlling access to collected data by remote destination systems by enforcing usage restrictions applied to the collected data, the method including one or more processing devices performing operations comprising:

receiving a first trait and a second trait that comprise data describing a user that has interacted with an online service, wherein the first trait is labelled with a first usage restriction regarding dissemination of data with the first trait via a data network and the second trait is labelled with a second usage restriction regarding dissemination of data with the second trait via the data network, the second usage restriction different from the first usage restriction;

combining the first trait and the second trait into a segment, wherein the segment preserves labelling of the first trait with the first usage restriction and the second trait with the second usage restriction;

receiving a request from a destination computing system to transmit segment data from the segment to the destination computing system; and controlling, based on the first usage restriction and the second usage restriction, transmission of the segment data to the destination computing system by performing one or more of:
  preventing a transmitting device from transmitting a first subset of the segment data to the destination computing system based on determining that a transmission of the first subset violates one or more of the first usage restriction and the second usage restriction, and
  causing the transmitting device to transmit a second subset of the segment data to the destination computing system based on determining that a transmission of the second subset is permissible under the first usage restriction and the second usage restriction.

2. The method of claim 1, the operations further comprising:

labelling the segment with a segment usage restriction, wherein the segment usage restriction is based on the first usage restriction and the second usage restriction, wherein the request comprises a dissemination request to disseminate a plurality of segments to the destination computing system, wherein the destination computing system is associated with a set of activities, wherein the segment is included in the plurality of segments; and controlling use of the plurality of segments based on corresponding segment usage restrictions, wherein controlling the use of the plurality of segments comprises one or more of:
  allowing a first set of segments of the plurality of segments to be disseminated to the destination computing system based on the corresponding segment usage restrictions, and
  preventing a second set of segments of the plurality of segments from being disseminated to the destination computing system based on the corresponding segment usage restrictions.

3. The method of claim 1, wherein the segment comprises a collection of traits, wherein the collection of traits includes the first trait and the second trait.

4. The method of claim 1, wherein the first trait originates from a first data source and the second trait is received utilizing an algorithmic model, wherein algorithmic model specifies a second data source as a source of data having the second trait, and wherein data obtained using the algorithmic model is labelled with a same set of usage restrictions as the second data source based on the algorithmic model specifying the second data source.

5. The method of claim 1, wherein controlling the transmission of the segment data further comprises:
  determining to provide information related to the first trait based on the first usage restriction and the second usage restriction; and
  determining to restrict information related to the second trait based on the first usage restriction and the second usage restriction.

6. The method of claim 1, wherein the destination computing system is associated with a set of activities, wherein controlling the transmission of the segment data is further based on the set of activities associated with the destination computing system, wherein controlling the transmission of the segment data comprises restricting the first trait and the second trait from being provided to the destination computing system based on determining that an activity from the set of activities violates at least one of the first usage restriction and the second usage restriction.

7. The method of claim 1, wherein the transmission of the segment data includes at least one of dissemination to one or more destinations, transmission of the segment data using electronic mail, or printing information related to the segment data.

8. A system for enforcing usage restrictions for collected data, the system comprising:

a processor; and a non-transitory computer-readable medium communicatively coupled to the processor, wherein the processor is configured for executing program code stored in the non-transitory computer-readable medium and thereby performing operations comprising:
  receiving a first trait and a second trait that comprise data describing a user that has interacted with an online service, wherein the first trait is labelled with a first usage restriction regarding dissemination of data with the first trait via a data network and the second trait is labelled with a second usage restriction regarding dissemination of data with the second trait via the data network, the second usage restriction different from the first usage restriction;
  combining the first trait and the second trait into a segment, wherein the segment preserves labelling of the first trait with the first usage restriction and the second trait with the second usage restriction;
  receiving a request from a destination computing system to transmit segment data from the segment to the destination computing system; and
  controlling, based on the first usage restriction and the second usage restriction, transmission of the segment data to the destination computing system by performing one or more of:
    preventing a transmitting device from transmitting a first subset of the segment data to the destination computing system based on determining that a transmission of the first subset violates one or more of the first usage restriction and the second usage restriction, and
    causing the transmitting device to transmit a second subset of the segment data to the destination computing system based on determining that a transmission of the second subset is permissible under the first usage restriction and the second usage restriction.

9. The system of claim 8, the operations further comprising:

labelling the segment with a segment usage restriction, wherein the segment usage restriction is based on the first usage restriction and the second usage restriction, wherein the request comprises a dissemination request to disseminate a plurality of segments to the destination computing system, wherein the destination computing system is associated with a set of activities, wherein the segment is included in the plurality of segments; and controlling use of the plurality of segments based on corresponding segment usage restrictions, wherein controlling the use of the plurality of segments comprises one or more of:
- allowing a first set of segments of the plurality of segments to be disseminated to the destination computing system based on the corresponding segment usage restrictions, and
- preventing a second set of segments of the plurality of segments from being disseminated to the destination computing system based on the corresponding segment usage restrictions.

10. The system of claim 8, wherein the segment comprises a collection of traits, wherein the collection of traits includes the first trait and the second trait.

11. The system of claim 8, wherein the first trait originates from a first data source and the second trait is received utilizing an algorithmic model, wherein algorithmic model specifies a second data source as a source of data having the second trait, and wherein data obtained using the algorithmic model is labelled with a same set of usage restrictions as the second data source based on the algorithmic model specifying the second data source.

12. The system of claim 8, wherein controlling the transmission of the segment data further comprises:
- determining to provide information related to the first trait based on the first usage restriction and the second usage restriction; and
- determining to restrict information related to the second trait based on the first usage restriction and the second usage restriction.

13. The system of claim 8, wherein the destination computing system is associated with a set of activities, wherein controlling the transmission of the segment data is further based on the set of activities associated with the destination computing system, wherein controlling the transmission of the segment data comprises restricting the first trait and the second trait from being provided to the destination computing system based on determining that an activity from the set of activities violates at least one of the first usage restriction and the second usage restriction.

14. The system of claim 8, wherein transmission of the segment data includes at least one of dissemination to one or more destinations, transmission of the segment data using electronic mail, or printing information related to the segment data.

15. A non-transitory computer-readable medium having program instruction stored thereon that, when executed by one or more processing devices, performing operations comprising:
- receiving a first trait and a second trait that comprise data describing a user that has interacted with an online service, wherein the first trait is labelled with a first usage restriction regarding dissemination of data with the first trait via a data network and the second trait is labelled with a second usage restriction regarding dissemination of data with the second trait via the data network, the second usage restriction different from the first usage restriction;
- combining the first trait and the second trait into a segment, wherein the segment preserves labelling of the first trait with the first usage restriction and the second trait with the second usage restriction;
- receiving a request from a destination computing system to transmit segment data from the segment to the destination computing system; and
- controlling, based on the first usage restriction and the second usage restriction, transmission of the segment data to the destination computing system by performing one or more of:
  - preventing a transmitting device from transmitting a first subset of the segment data to the destination computing system based on determining that a transmission of the first subset violates one or more of the first usage restriction and the second usage restriction, and
  - causing the transmitting device to transmit a second subset of the segment data to the destination computing system based on determining that a transmission of the second subset is permissible under the first usage restriction and the second usage restriction.

16. The non-transitory computer-readable medium of claim 15, the operations further comprising:
- labelling the segment with a segment usage restriction, wherein the segment usage restriction is based on the first usage restriction and the second usage restriction, wherein the request comprises a dissemination request to disseminate a plurality of segments to the destination computing system, wherein the destination computing system is associated with a set of activities, wherein the segment is included in the plurality of segments; and
- controlling use of the plurality of segments based on corresponding segment usage restrictions, wherein controlling the use of the plurality of segments comprises one or more of:
  - allowing a first set of segments of the plurality of segments to be disseminated to the destination computing system based on the corresponding segment usage restrictions, and
  - preventing a second set of segments of the plurality of segments from being disseminated to the destination computing system based on the corresponding segment usage restrictions.

17. The non-transitory computer-readable medium of claim 15, wherein the segment comprises a collection of traits, wherein the collection of traits includes the first trait and the second trait.

18. The non-transitory computer-readable medium of claim 15, wherein the first trait originates from a first data source and the second trait is received utilizing an algorithmic model, wherein algorithmic model specifies a second data source as a source of data having the second trait, and wherein data obtained using the algorithmic model is labelled with a same set of usage restrictions as the second data source based on the algorithmic model specifying the second data source.

19. The non-transitory computer-readable medium of claim 15, wherein controlling the transmission of the segment data further comprises:
- determining to provide information related to the first trait based on the first usage restriction and the second usage restriction; and
- determining to restrict information related to the second trait based on the first usage restriction and the second usage restriction.

20. The non-transitory computer-readable medium of claim 15, wherein the destination computing system is associated with a set of activities, wherein controlling the transmission of the segment data is further based on the set of activities associated with the destination computing system, wherein controlling the transmission of the segment data comprises restricting the first trait and the second trait from being provided to the destination computing system based on determining that an activity from the set of activities violates at least one of the first usage restriction and the second usage restriction.

\* \* \* \* \*